United States Patent [19]

Palmer

[11] 4,287,796
[45] Sep. 8, 1981

[54] TOOL FOR PREPARING TUBE ENDS FOR WELDING

[76] Inventor: William D. Palmer, 195 Brier Hill Rd., London, Ontario, Canada, N5Y 4V8

[21] Appl. No.: 119,100

[22] Filed: Feb. 6, 1980

[30] Foreign Application Priority Data

Jun. 26, 1979 [CA] Canada .................................. 330609

[51] Int. Cl.³ .......................... B23B 3/22; B23B 51/00
[52] U.S. Cl. ..................................... 82/4 C; 408/191; 408/200
[58] Field of Search ................. 82/4 R, 4 C; 408/104, 408/186, 189, 191, 193, 194, 197, 200, 201, 202, 203, 203.5, 211

[56] References Cited

U.S. PATENT DOCUMENTS

| | | | |
|---|---|---|---|
| 3,228,268 | 1/1966 | Strout | 408/211 |
| 3,636,803 | 1/1972 | Miller | 82/4 C |
| 3,645,640 | 2/1972 | Zukas | 408/225 |
| 3,870,432 | 3/1975 | Strybel | 408/191 |
| 3,999,452 | 12/1976 | Larsen | 82/4 C |
| 4,197,042 | 4/1980 | Krhounek | 408/200 |
| 4,220,060 | 2/1980 | Bjodstrup | 408/191 |

FOREIGN PATENT DOCUMENTS 2658344  1/1978  Fed. Rep. of Germany ...... 408/211

Primary Examiner—Harrison L. Hinson

[57] ABSTRACT

There is provided a new and useful tool for preparing tube or pipe ends for welding. The tool provides a central shaft, chamfering blade support means affixed to and coaxial with the central shaft and including a recess for receiving drive means, at least one support web and a chamfering blade attached to the at least one web; squaring blade support means coaxial with said shaft and positionable longitudinally along the shaft and rotatable with the chamfering blade support means, and having affixed to it at least one squaring blade; and alignment means for aligning the shaft with the tube or pipe end.

17 Claims, 3 Drawing Figures

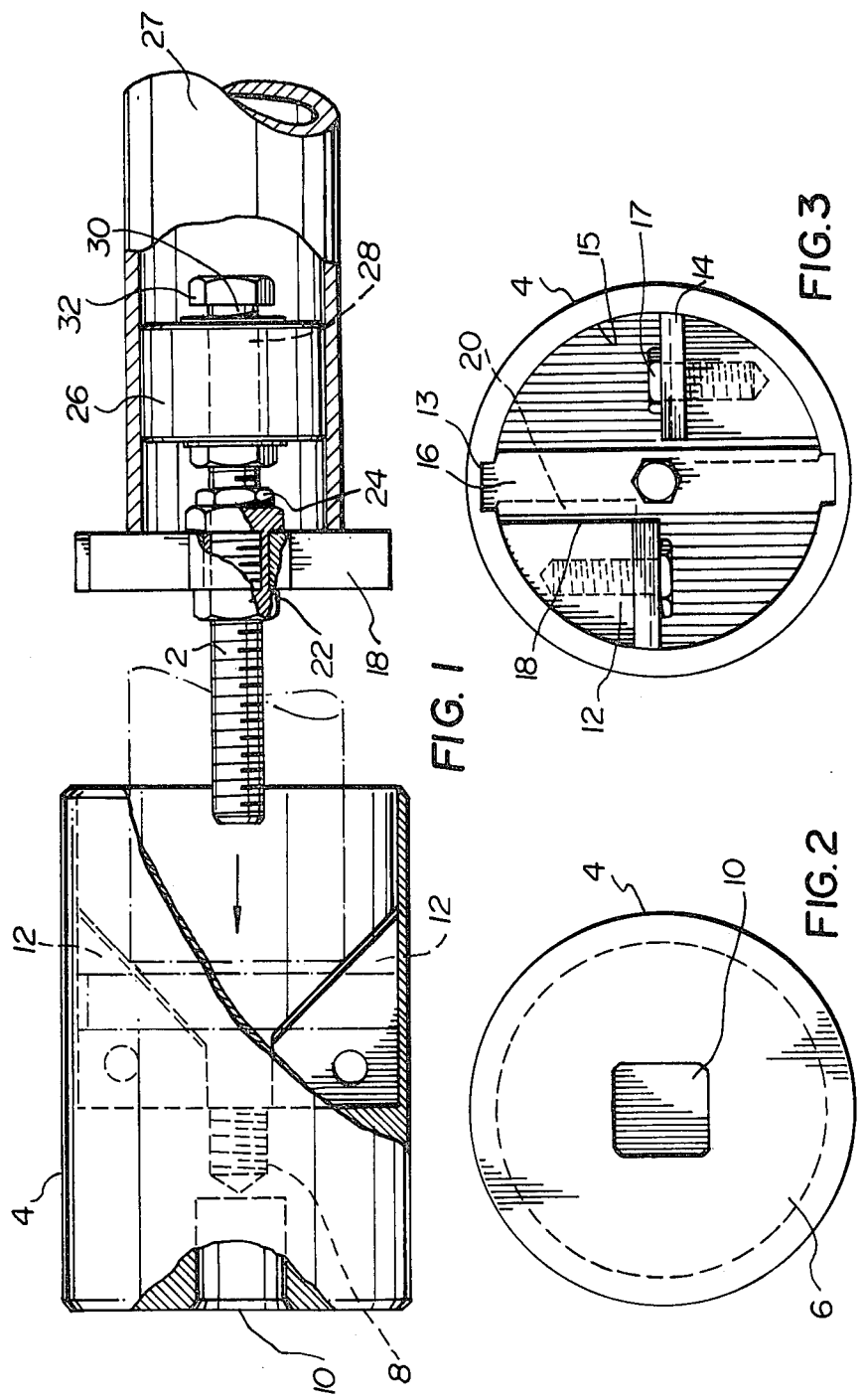

TOOL FOR PREPARING TUBE ENDS FOR WELDING

BACKGROUND OF THE INVENTION

This invention relates to a combination tool for preparing tube or pipe ends for welding.

As is well known in the welding art, where it is desired to join the ends of pipe or tubing by welding, the ends are generally prepared by chamfering or bevelling. It is frequently necessary and desirable to dress the ends in this way at the work station or job site. To that end, it is useful to have a portable tool to carry out the end dressing operation which is effective yet reliable. These qualities would be present in a tool which is sufficiently tough, is sufficiently light and is of a simple enough construction to avoid mechanical failure.

A further useful feature of such a tool is that it be capable of dressing the ends of fairly tight bends in the pipe or tubing, and, therefore, that it be relatively short and compact.

Various tools have been developed in the past to achieve various of these objectives. These generally have either been inadequate to do the job or suffered from frequent maintenance problems. As a result, there is currently no tool commercially available which satisfactorily fulfills all of the requirements.

An example of one such attempt is illustrated in U.S. Pat. No. 3,999,452, which describes a tool which is adjustable for chamfering or facing, but not both in combination. The tool is illustrative of known tools which are reasonably simple in construction, but in the use of which a number of operations and adjustments are required to complete a single pipe and dressing.

A further example of a combination chamfering and facing tool is found in U.S. Pat. No. 3,228,268. The obvious complexity of this tool is illustrative of one likely to lead to maintenance difficulties.

The present invention overcomes a number of the disadvantages of past tools in providing a tool which is simple in construction and yet strong and capable of performing a complete end dressing.

SUMMARY OF THE INVENTION

Thus, the invention provides a tool for preparing a tube or pipe end for welding comprising a central shaft; chamfering blade support means affixed to and coaxial with the central shaft and including a recess for receiving drive means, at least one support web and a chamfering blade affixed to each at least one said web; squaring blade support means coaxial with said shaft and positionable longitudinally along said shaft independently of the position of the chamfering blade support means, and rotatable with said chamfering blade support means, and having affixed thereto at least one squaring blade; and alignment means for aligning said shaft with said tube or pipe end.

BRIEF DESCRIPTION OF THE DRAWINGS

In drawings which illustrate embodiments of the invention,

FIG. 1 is a partially cut away and partially exploded view of the device showing a section of pipe mounted over the alignment means.

FIG. 2 is a top view of the end cap showing the recess for receiving the pneumatic tool.

FIG. 3 is a bottom view of the end cap with all cutting blades in place but with the alignment means removed.

DETAILED DESCRIPTION OF THE INVENTION

In a preferred embodiment of the invention, the shaft 2 is threaded throughout most of its length. The partly hollow cylindrical cap 4 having a closed end 6 is threadedly attached to the shaft 2 at one end thereof by means of a threaded recess 8 located axially of the cylinder on the interior side of the closed end 6. Recessed axially into the exterior side of the closed end 6 is an opening 10 to receive the drive means of an impact a pneumatic driving tool or the like. The impact tool provides greater power and little load shock to the operator.

Permanently affixed within the cap 4 are located blade support webs 12. Chamfering blades 14 are affixed to the webs 12 by means of cap screws 17. The blades are thus readily removable for sharpening or replacement. The number of webs and blades is not a critical feature, but there are preferably at least two for reasons of balance. For larger pipe diameters, a larger number of blades, such as 4 or 6 may be utilized. Further, the blades, if desired, could be integral with the support webs. The angle at which the chamfering blades address the pipe end is most commonly 45 degrees but may be varied as desired. The support webs 12 are preferably angled at 45 degrees to accommodate the most commonly used blade angle. However, this web support angle can accommodate a wide range of blade angles, most readily 0-45 degrees.

Further, the cutting geometry of the blades may be changed as required for different pipe or tubing materials. Cap 4 has grooves 13 on its inner surface 15 to receive co-operating ends 16 of the squaring blade support 18. The squaring blades 20 are preferably formed integrally with the blade support 18; but could as well be detachable therefrom in the manner of the chamfering blades 14. Since the squaring blades generally are required to remove much less material than the chamfering blades, two squaring blades are sufficient.

The squaring blade support 18 is mounted on the central shaft 2 by means of the captive floating nut 22 which is threadedly movable longitudinally on shaft 2. A jam nut may be utilized to lock the nut 22 in any position on the shaft. The squaring blade support 18 and the associated blades 20 can thereby be fixed at any desired location longitudinally of the shaft 2 while remaining freely rotatable on nut 22. Expressed in the opposite sense, the nut 22 permits the support 18 to be moved longitudinally of the shaft 2 independent of rotation of the support 18.

The squaring blade support 18 extends radially from the shaft 2 a distance such that the co-operating ends 16 of support 18 are slidably received within grooves 13 of the cap 4. Thus the squaring blade by means of nut 22 can be moved up and down the shaft 2 slidably within the grooves 13, for positioning relative to the chamfering blades.

The above elements in combination comprise the cutting section of the tool. The elements now to be described comprise the aligning section of the tool.

The alignment means is in the form of a cylinder 26 having an axial bore 28 and coaxially located on the shaft 2 and freely rotatable thereon. The assembly is shown inserted into the end of a pipe 27 in FIG. 1. That part of the shaft 2 carrying the cylinder is not threaded but is smooth to form a bearing surface 30 for the cylinder. The bearing surface 30 may be reduced in diameter from the threaded portion of the shaft 2. In that case, the cylinder 26 is held in position on the bearing surface 30 on the shaft 2 at one end by means of the enlarged diameter of the shaft 2 and at the other end by means of nut 32. Preferably there is only lubrication clearance between the bore 28 and the bearing surface 30.

For commercial purposes a series of such cylinders 26 would be made available corresponding approximately in outside diameter to the inside diameter of nominal pipe sizes. The outside diameter of the cylinders 26 would in all cases be slightly less than the corresponding inside diameter of the nominal pipe sizes in order that the cylinder can be inserted smoothly into the pipe or tube.

While for illustrative purposes, the alignment means has been represented as a cylinder, any device to function in a similar manner would be suitable. For example, a cylindrical core with radially extending arms, or two or more thinner, spaced cylinders similar to washers would also serve.

In operation, the squaring blade support 18 is adjusted longitudinally of the shaft 2 within the grooves 13 of the cap 4 by twisting of the nut 22 and the lock nut 24. The support 18 is positioned depending on the pipe size and according to the desired amount of nose, from a chamfer with no nose to a squared-off facing. The cylindrical spindle 26 is then inserted into the pipe or tube until the squaring and/or chamfering blades contact the pipe or tube end. While the cap 4 is supported by hand, drive means is then inserted into the recessed opening 10 and the desired cut is made.

Alternatively, the pipe face can be squared off using squaring blades 20, the blades 20 then moved out of operative position, and the desired cut applied with the chamfering blades 14.

In a further embodiment of the invention, different caps 4 are provided for different ranges of pipe size. Thus for larger pipe sizes it is convenient to utilize a cap having a stepped configuration such that the closed end of the cap is of smaller diameter than the open end. This facilitates gripping the cap in use.

While the invention has been described in detail in respect of the preferred embodiments, it will be understood that it is not intended to limit the invention to those embodiments. On the contrary it is intended to cover all alternatives, modifications and equivalents as may be included within the spirit and scope of the present invention.

What I claim as my invention is:

1. A tool for preparing a tube or pipe end for welding comprising:
    a central shaft;
    chamfering blade support means affixed to and coaxial with the central shaft and including a recess for receiving drive means, at least one support web and a chamfering blade affixed to each at least one said web;
    squaring blade support means coaxial with said shaft and positionable longitudinally along said shaft independently of the position of said chamfering blade support means, and rotatable with said chamfering blade support means, and having affixed thereto at least one squaring blade;
    and alignment means for aligning said shaft with said tube or pipe end.

2. The tool of claim 1, wherein the said shaft is threaded throughout a substantial part of its length.

3. The tool of claim 2, wherein the said shaft is threadedly attached to said chamfering blade support means.

4. The tool of claim 1, wherein said chamfering blade support means is a partially hollow cylindrical cap closed at one end.

5. The tool of claim 4, wherein said closed end includes axially on its outer side said recess for receiving drive means.

6. The tool of claim 4, wherein said closed end includes axially on its inner side a second recess for receiving the end of said shaft.

7. The tool of claim 6, wherein said shaft is connected to said cap by threaded engagement in said second recess.

8. The tool of claim 4, wherein said chamfering blade is integral with said at least one support web.

9. The tool of claim 4, wherein said chamfering blade is attached by means of a cap screw to said at least one support web.

10. The tool of claim 1, wherein said squaring blade support means is postionable along said shaft by means of a captive floating nut threadedly engaging said shaft.

11. The tool of claim 4, wherein the inner curved surface of said cap contains at least one longitudinal groove, said squaring blade support means is radially extended to slidably cooperate with said at least one groove, and said squaring blade support means is positionable along said shaft by means of a captive floating nut threadedly engaging said shaft.

12. The tool of claim 1, wherein said alignment means comprises a device coaxially located on said shaft and freely rotatable thereon, and sized to fit closely within said tube or pipe end.

13. The tool of claim 12, wherein said device is a cylinder bored to have only lubrication clearance from said shaft.

14. The tool of claim 4, wherein said squaring blade support means is positionable along said shaft by means of a captive floating nut threadedly engaging said shaft.

15. The tool of claim 14, wherein the inner curved surface of said cap contains at least one longitudinal groove, said squaring blade support means is radially extended to slidably cooperate with said at least one groove, and said squaring blade support means is positionable along said shaft by means of a captive floating nut threadedly engaging said shaft.

16. The tool of claim 15, wherein said alignment means comprises a device coaxially located on said shaft and freely rotatable thereon, and sized to fit closely within said tube or pipe end.

17. The tool of claim 16, wherein said device is a cylinder bored to have only lubrication clearance from said shaft.

* * * * *